United States Patent [19]

Kuehnert

[11] Patent Number: 4,693,363
[45] Date of Patent: Sep. 15, 1987

[54] CONTROL DEVICE AND PROCESS FOR ALIGNING AN ENDLESS BELT UTILIZING THE CONTROL DEVICE

[75] Inventor: Egbert Kuehnert, Erzhausen, Fed. Rep. of Germany

[73] Assignee: Hoechst Aktiengesellschaft, Frankfurt am Main, Fed. Rep. of Germany

[21] Appl. No.: 791,448

[22] Filed: Oct. 25, 1985

[30] Foreign Application Priority Data

Oct. 27, 1984 [DE] Fed. Rep. of Germany ....... 3439456

[51] Int. Cl.$^4$ ............................................. B65G 39/16
[52] U.S. Cl. .................................................. 198/807
[58] Field of Search ................ 198/806, 807, 808, 810

[56] References Cited

U.S. PATENT DOCUMENTS

| 2,724,492 | 11/1955 | Kolbe ................................... 198/807 |
| 2,914,957 | 12/1959 | Johnson ........................... 198/807 X |
| 3,159,268 | 12/1964 | Dyke .................................... 198/807 |
| 4,173,904 | 11/1979 | Repetto ........................... 198/807 X |

FOREIGN PATENT DOCUMENTS

| 0204132 | 6/1956  | Australia ............................. 198/807 |
| 1247938 | 8/1967  | Fed. Rep. of Germany ...... 198/807 |
| 2815953 | 11/1978 | Fed. Rep. of Germany . |
| 105175  | 4/1974  | German Democratic Rep. . |
| 0920775 | 3/1963  | United Kingdom ................ 198/807 |
| 1561354 | 2/1980  | United Kingdom . |

OTHER PUBLICATIONS

Lueger, "Lexikon der Technik", vol. 14, 1969, pp. 115, 116, (4th printing).

Primary Examiner—Robert J. Spar
Assistant Examiner—Lyle Kimms
Attorney, Agent, or Firm—Schwartz, Jeffery, Schwaab, Mack, Blumenthal & Evans

[57] ABSTRACT

Disclosed is a control device and process for aligning, in the running direction, an endless belt. The device comprises a lifting cylinder with a ram which is retracted or extended as a result of switching signals received from microswitches via a control circuit. The device further includes a pivotal wing which is pivoted by the extending ram in the running direction A of the belt, and a deflecting roller having an axle, the ends of which are mounted in the eyeparts of eyebolts. During pivoting, the wing presses one eyebolt, resting at its bolt end against the front side of the wing, in the running direction A of the belt. The axle, mounted at its axle end, with a certain play in the eyepart of the other positionally fixed eyebolt, is pivoted as a result. As soon as the belt runs out of alignment, that is to say deviates from the running direction A, one of the belt edges actuates the associated microswitch and consequently the lifting cylinder. As a result of the pivoting of the axle of the deflecting roller, the non-aligned running of the belt is constantly counteracted and the belt is deflected counter to the nonaligned direction until it actuates the other microswitch.

18 Claims, 2 Drawing Figures

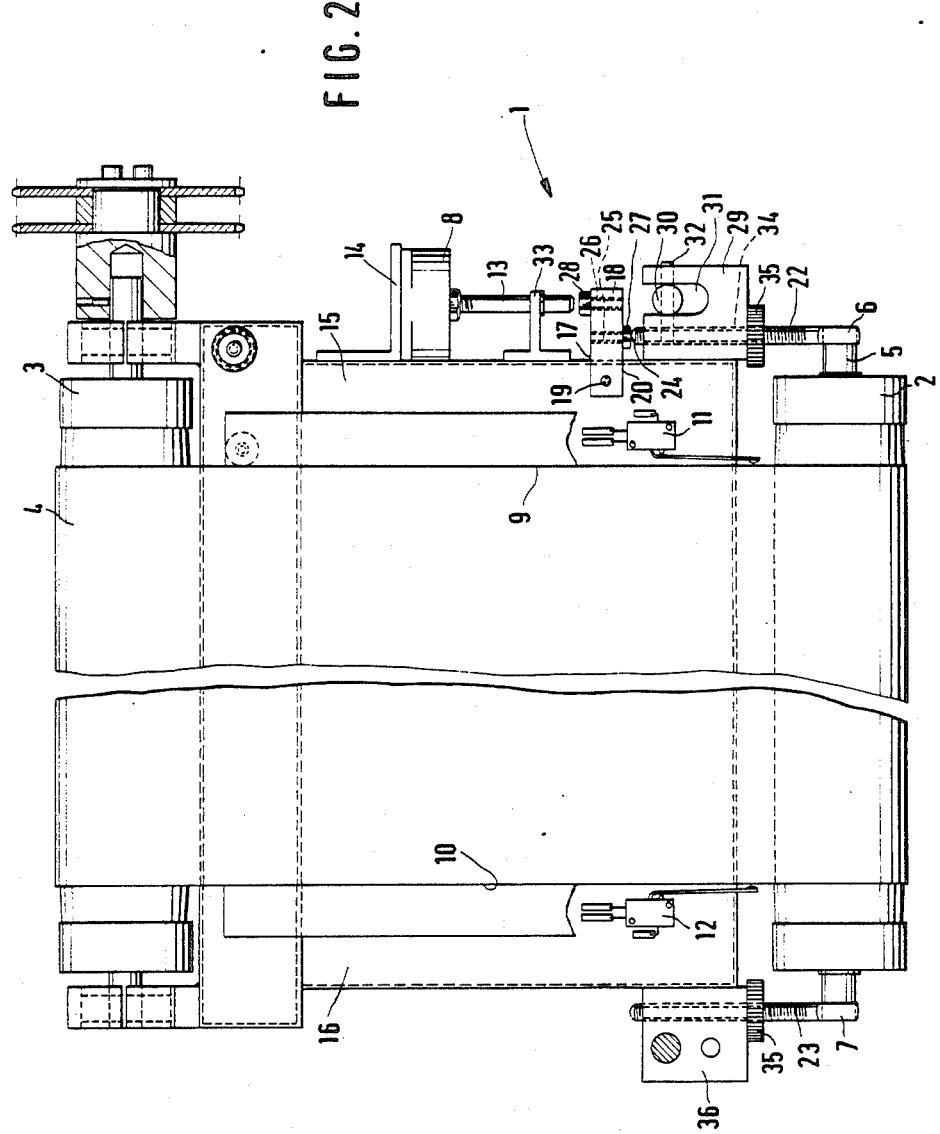

CONTROL DEVICE AND PROCESS FOR ALIGNING AN ENDLESS BELT UTILIZING THE CONTROL DEVICE

BACKGROUND OF THE INVENTION

The present invention relates to a control device and a process utilizing the control device for aligning, in the running direction, an endless belt revolving around a driven roller and a deflecting roller.

In the course of rotation of endless belts guided over two or more rollers, difficulties regarding the straight running of belts are known to arise after a relatively long operating period. Reasons for the belts running out of alignment primarily include deviations in the concentricities of the rollers, a deficient parallel alignment of the roller axles, varying heating at different points on the individual belt, varying belt abrasion, an uneven load distribution on the belt and the like.

The problem is remedied to a certain extent by so-called cambered rollers, as compared to cylindrical rollers or cylinders. Cambered rollers are rollers or cylinders which possess a non-uniform diameter over their length and, for example, have a larger diameter in the roller or cylinder center than near the end faces of the roller or cylinder. However, as with cylindrical rollers, even when the rollers are designed in this way, it is necessary to make them as identical as possible with maximum precision, thus making it considerably more expensive to produce the rollers because of the high precision required.

SUMMARY OF THE INVENTION

It is therefore an object of the present invention to design a control device of the type described above, which counteracts the nonaligned running of the belt, irrespective of whether the deviation is to the left or right relative to the running direction of the belt, in order to obtain as straight a belt run as possible in the running direction.

Another object of the present invention is to achieve aligned revolution of the endless belt by less expensive means than previously available.

Yet another object of the present invention is to provide a process for the aligned operation of the endless belt.

In accomplishing the foregoing objects, there has been provided in accordance with one aspect of the present invention, a control device for aligning, in the running direction, an endless belt, comprising an endless belt which revolves around a driven roller and a deflecting roller, wherein the deflecting roller includes an axle extending transversely to the running direction of the endless belt, a control circuit which includes at least two microswitches, one of which is positioned near each edge of the endless belt, and a lifting cylinder comprising an extendable ram which adjusts the position of one of the axle ends of the axle responsive to a signal received from one of the microswitches when the switch contacts the belt edge of the endless belt. Preferably, the control device further comprises a first horizontal member which extends parallel to the running direction of the endless belt, and a pivotal wing which pivots about the first horizontal member. Advantageously, the pivotal wing is U-shaped, with the legs of the wing extending on either side of the first horizontal member. Preferably, the control device further comprises a second longitudinal member which extends parallel to the running direction of the endless belt and is positioned on the side of the endless belt opposite the first horizontal member, and an angular block attached to one of the longitudinal members and in operative contact with the lifting cylinder.

In one preferred embodiment, the control device further comprises a cross-member which extends between the upper and lower strands of the endless belt and which connects the first and second horizontal members, wherein the microswitches are positioned on the cross-member.

In another preferred embodiment, the control device further comprises a first plate having a slot and being positioned against the first horizontal member, a stay extending through the slot of the first plate, and a pin which fixedly positions the stay to the first plate.

In accordance with another aspect of the present invention, there has been provided a process for continuously aligning an endless belt, comprising the steps of pivoting an axle end of a deflecting roller about which an endless belt revolves by means of a pivotal wing which is pivoted by an extendable ram of a lifting cylinder, actuating a microswitch positioned near an edge of the endless belt when the endless belt runs out of alignment, and retracting the extendable ram to reduce the pivotal force applied to the axle end.

The present invention is not restricted to an endless belt revolving around two rollers, but can also be used on endless belts running over more than two rollers. The invention achieves the advantage that the deviation of the belt to the left or right from the straight running direction is corrected, without the belt drive being stopped. This results from the deflection of the axle of one of the rollers, usually the deflecting roller, from its parallel position relative to the axle of a further roller, e.g., a driven roller, or relative to the axles of several rollers.

Other objects, features and advantages of the present invention will be made apparent by the detailed description of preferred embodiments which follows, when considered in view of the attached figures of drawing.

BRIEF DESCRIPTION OF THE DRAWING

In the drawing:

FIG. 2 presents a plan view of a second embodiment of the control device according to the present invention.

DETAILED DESCRIPTION OF PREFERRED EMBODIMENTS

Figure 1:
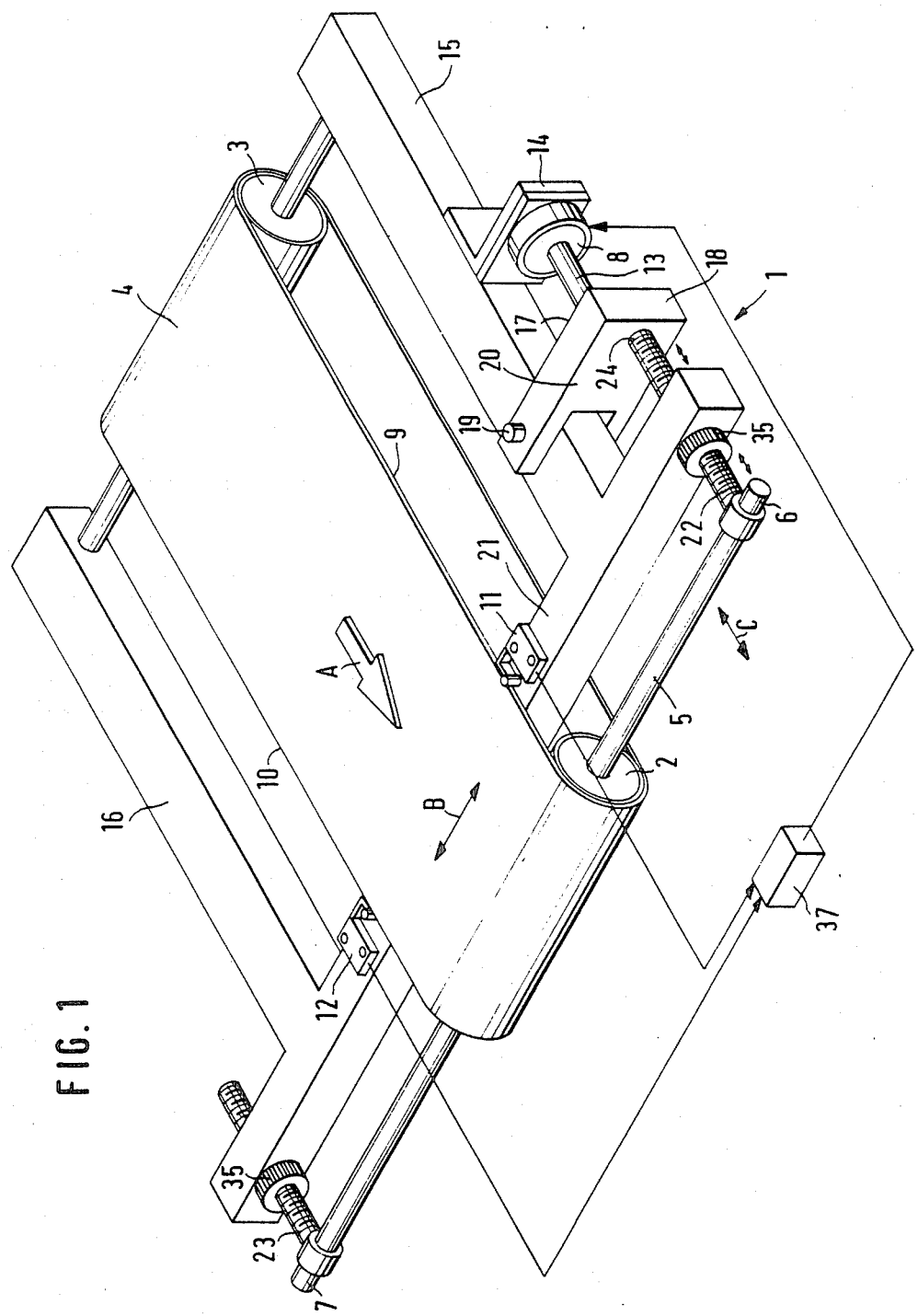
FIG. 1 presents a diagrammatic perspective view of a first embodiment of the control device according to the present invention.

The objects of the present invention are achieved as a result of the adjustability of one axle end of the axle of the deflecting roller positioned transversely relative to the running direction of the belt. The axle end is adjustable in the running direction by means of a lifting cylinder. Additionally a microswitch is located near each belt edge and, upon contact with the belt edge, sends a switching signal from a control circuit to the lifting cylinder in order to extend or retract a ram. At the same time, the other axle end of the axle of the deflecting roller is appropriately mounted with play in an eyebolt fixed in position, thus ensuring that the axle of the deflecting roller is pivoted by the lifting cylinder about this positionally fixed axle end functioning as a fulcrum.

In one embodiment of the present invention, the lifting cylinder rests on an angular block fastened to a longitudinal member which extends parallel to the running direction of the belt.

In a further development, the ram of the lifting cylinder passes through a guide attached to the longitudinal member, and the end of the ram is located opposite the rear side of a pivotal wing, the cross-section of which has the form of a horizontally arranged U, the two legs of which surround the longitudinal member and are connected to one another by means of a vertical axle, about which the wing can pivot. In this embodiment, the longitudinal member is connected to a cross-member which extends between the upper and lower sides of the belt and on the top side of which are arranged the two microswitches, each of which is located near one of the two belt edges.

The axle ends of the axle of the deflecting roller are appropriately mounted in eyebolts which are arranged parallel to the belt edges on both sides of the belt and which are guided through the cross-member. The bolt end of one eyebolt rests against the front side of the wing, and is offset laterally relative to the ram of the lifting cylinder. The other eyebolt has a specific play relative to the axle end of the axle of the deflecting roller, thus allowing the axle of the deflecting roller to be pivoted inside this eyebolt when the ram of the lifting cylinder is extended and pressed against the rear side of the wing, thereby pivoting the latter in the running direction of the belt.

To support the ram and the bolt end of the eyebolts resting against the front side of the wing, screws are appropriately screwed into the front and rear sides of the wing, with the screw heads constituting abutments for the bolt end of the eyebolt and the end of the ram.

In a second embodiment of the present invention, a plate resting against the longitudinal member is supported by a stay which extends through a slot in the plate and which is fixedly positioned to the plate by a pin. At the same time, the plate is designed to include a continuous guide parallel to the longitudinal member, and through which an eyebolt passes. The eyebolt projects from both sides of the plate and rests by means of the bolt end against the front side of the wing, with one axle end of the axle of the deflecting roller being mounted in the eye part of the other eyebolt end. The other axle end of the axle of the deflecting roller is mounted with play in an eyebolt. The eyebolt passes through a plate located on the other longitudinal member.

Appropriately, each of the two eyebolts is screwed to a bolt nut which rests against the cross-member or the plates and limits the displacement of the eyebolts counter to the running direction of the belt.

Turning now to the figures of drawing, FIG. 1 illustrates, in a diagrammatic and perspective representation, a first embodiment of the control device 1 for pivoting an axle 5 of a deflecting roller 2. An endless belt 4 is guided over the deflecting roller 2 and over a further roller 3, which is a drive roller. The endless belt 4 is usually a conveyor belt, on which any article, such as, for example, printing plates, are conveyed. The control device 1, described in further detail below, can be used universally to prevent an endless belt guided over rollers from running out of alignment laterally. For example, a control device 1 of this type can be used in a heating device, such as that described in German Patent Application No. P 34 20 429.6. The heating device described in the German application includes two endless conveyor belts, each of which is guided via two rollers. The lower conveyor belt is guided over a transport roller and a drive roller which is driven by a motor. The underside of the upper strand of the conveyor belt, when the conveyor belt rotates, slides in contact over a heating plate of an electrical heating element fixed in position. The conveyor belt is thereby heated. The upper non-driven conveyor belt revolves over the transport rollers and is in slight pressure contact with the driven lower conveyor belt, so that it is taken up by the latter as a result of friction. The two conveyor belts run synchronously. The lower strand of the upper conveyor belt slides in contact over a heating plate of the upper electrical heating element which heats the conveyor belt. A lamination carrier, which is grasped and further conveyed by the conveyor belts after it enters the heating device and which is to be laminated on both sides with photoresist film after it leaves the heating device, is heated on both sides by the conveyor belts.

Where endless belts are concerned, after a relatively long period of continuous operation, the problem often arises that the belt is deflected laterally away from the predetermined straight running direction. The reasons for this can be, among other things, slight differences in the parallel alignment of the axles of the rollers, slight deviations in the outside diameter of the rollers relative to one another, varying heat distributions in the belts, etc.

The axle of the drive roller 3 is mounted on longitudinal members 15 and 16 which extend parallel to the belt edges 9 and 10 of the belt 4. The longitudinal members 15 and 16 are connected to a cross-member 21 which extends between the upper and lower strands of the belt 4. On the top sides of the cross-member are arranged two microswitches 11 and 12. Each of these microswitches 11 and 12 is located in close proximity to one of the two belt edges 9 and 10. As soon as the belt 4 starts to laterally run out of alignment, either the belt edge 9 touches the switch lug of the microswitch 11 or the belt edge 10 touches the switch lug of the microswitch 12, depending on the direction of deflection of the belt 4. As soon as contact is made between one of the belt edges and the corresponding microswitch, a lifting cylinder 8 receives a switching signal via a control circuit 37, to effect extension or retraction of a ram 13 of the lifting cylinder 8.

The axle 5 of the deflecting roller 2 is mounted by means of its axle ends 6 and 7 in eyebolts 22, 23 which are arranged parallel to the belt edges 9 and 10 on both sides of the belt 4. The eyebolts 22 and 23 are guided through the cross-member 21 and each is screwed to a bolt nut 35, the latter resting against the cross-member 21. The bolt nuts limit displacement of the eyebolts counter to the running direction A of the belt 4. A bolt end 24 of one eyebolt 22 rests against a front side 20 of a wing 18, while the bolt end of the other eyebolt 23 projects freely from the rear side of the cross-member 21.

The lifting cylinder 8 is attached to an angular block 14 fastened to one longitudinal member 15. The end of the ram 13 of the lifting cylinder 8 is located opposite the rear side 17 of the wing, the cross-section of which is in the form of a horizontally arranged U. The two legs of the wing 18 surround the longitudinal member 15 and are connected to one another by means of a vertical axle 19 passing through the longitudinal member 15. The wing 18 can thus pivot about the vertical axle 19. The eyebolt 22, which rests by means of its bolt end 24 against the front side 20 of the wing 18, is offset laterally relative to the ram 13 of the lifting cylinder 8.

One axle end 6 of the axle 5 of the deflecting roller 2 is adjusted in the running direction A by the lifting cylinder 8, as will be described in more detail below. The other axle end 7 of the axle 5 is mounted with a slight play in the positionally fixed eyebolt 23 to allow for adjustment of the lifting cylinder.

The control device 1 works as follows.

When the belt 4 starts to run out of alignment laterally in the transverse direction B, for example, the belt edge 9 first touches the microswitch 11 which sends a control signal to the lifting cylinder 8 via the control circuit 37. As a result, the ram 13 is extended and the wing 18 is pivoted in the running direction A. The movement of the wing is transmitted to the axle 5 of the deflecting roller 2 via the eyebolt 22. The axle end 6 of the axle 5 is pivoted forward in the direction of the double arrow C, and the other axle end 7 in the eye part of the positionally fixed eyebolt 23 acts as a fulcrum for the axle 5 because of the play between the axle end 7 and the eyepart of the eyebolt 23. The axle 5 is pivoted until the lifting force of the lifting cylinder 8 is equal to the tensioning force of the belt 4 which, as a result of the pivoting of the axle 5, aquires an additional tension limiting the pivoting movement. The pivoting of axle 5 counteracts the "out-of-alignment" running of the belt, a movement counter to the transverse direction B followed by the belt movement is initiated, and the belt 4 is moved beyond the track center until it actuates the other microswitch 12.

During the time when the belt is guided back, the ram 13 is constantly extended and rests against the wing 18. When the belt 4 starts to run out of alignment in the other direction beyond the track center, the microswitch 12 is switched by the belt edge 10 and the lifting cylinder 8 receives, via the control circuit 37, a control signal which causes the ram 13 to retract. Retraction of the ram results in the axle 5 of the deflecting roller 2 being pivoted in the pivoting direction C counter to the running direction A as a result of the tensile stress of the belt 4 which then prevails. At the same time, the bolt nut 35 of the eyebolt 22 limits this pivoting movement of the axle 5 to the rear, since it stops the pivoting movement as soon as it abuts the cross-member 21.

FIG. 2 illustrates in a plan view a second embodiment of the control device 1, in which components identical to those of the first embodiment bear the same reference symbols and are not described in any more detail.

In addition to the embodiment according to FIG. 1, in the second embodiment there is also a guide 33 which is attached to one longitudinal member 15 and through which passes the ram 13 of the lifting cylinder 8 which rests on the angular block 14 fastened to the longitudinal member 15. The end of the ram 13 is located opposite the rear side 17 of the wing 18. Screws 25 and 26 are screwed into the front and rear sides 20, 17 of the wing 18, and their heads 27 and 28 constitute adjustable abutments for the bolt end 24 of the eyebolt 22 and the end of the ram 13. The ram 13 is offset outwardly relative to the eyebolt 22, so that it can exert a correspondingly high torque on the wing 18. Instead of the cross-member 21 of the first embodiment, plates 29 and 36 are provided on and rest against the respective longitudinal members 15 and 16. The plate 29, located on the same side as the lifting cylinder 8, is supported by a stay 30 which extends through a slot 31 in the plate 29. The stay (30) is fixed to a stationary external member, not shown. The stay 30 is fixedly connected to the plate 29 in position by a pin 32. A continuous guide 34 extends through the plate 29 parallel to the longitudinal member 15, and the eyebolt 22 passes through this guide 34. The eyebolt 22 projects from the plate on both sides and rests by means of its bolt end against the head 27 of the screw 25. The axle end 6 of the axle 5 of the deflecting roller 2 is mounted in the eye part of the eyebolt 22 at the other end.

The other axle end 7 of the axle 5 of the deflecting roller 2 is mounted in the other eyebolt 23 with a certain play which allows a small rotary movement within the eye part of the eyebolt. The eyebolt 23 passes through the plate 36 in a similar way to that in which the eyebolt 22 passes through the plate 29. To limit the pivoting movement of the axle 5, the two eyebolts 22 and 23 of this embodiment are likewise screwed to bolt nuts 35 which rest against the plates 29 and 36 when the axle 5 executes correspondingly large pivoting movements counter to the running direction A of the belt 4.

What is claimed is:

1. A control device for aligning, in the running direction, an endless belt, comprising:
an endless belt which revolves around a driven roller and a deflecting roller, wherein said deflecting roller includes an axle extending transversely to the running direction of said endless belt;
a first longitudinal member extending parallel to the running direction of said endless belt;
a pivotal wing which pivots about a pivot pin extending through said first horizontal member perpendicularly to said endless belt;
a control circuit which includes at least two microswitches, one of which is positioned near each edge of said endless belt;
a lifting cylinder comprising an extendable ram for adjusting the position of one of the axle ends of said axle responsive to a signal received from one of said microswitches when said microswitch contacts the belt edge of said endless belt, said ram being arranged to pivot said pivotal wing upon movement of the ram; and
two eyebolts having eye parts for receiving the ends of said axle, said eyebolts being positioned parallel to and on either side of said endless belt, wherein the eyebolt positioned on the same side of said endless belt as said pivotal wing extends to and abuts said wing.

2. A control device as claimed in claim 1, wherein said pivotal wing is U-shaped and comprises legs which extend on either side of said first horizontal member.

3. A control device as claimed in claim 2, wherein said pivot pin connects said extending legs of said wing.

4. A control device as claimed in claim 1, further comprising:
a second longitudinal member which extends parallel to the running direction of said endless belt and is positioned on the side of said endless belt opposite said first longitudinal member; and
an angular block attached to said first longitudinal member for supporting said lifting cylinder.

5. A control device as claimed in claim 4, further comprising a guide positioned between said angular block and said pivotal wing and attached to said first longitudinal member for guiding said ram of said lifting cylinder.

6. A control device as claimed in claim 5, wherein said ram of said lifting cylinder extends from said angular block through said guide to a point just short of said wing.

7. A control device as claimed in claim 1, further comprising a cross-member which extends between upper and lower runs of said endless belt and which connects said first and second horizontal members, wherein said microswitches are positioned on said cross-member.

8. A control device as claimed in claim 7 wherein said eyebolts extend through said cross-member.

9. A control device as claimed in claim 8, wherein the eyepart of said eyebolt positioned on the side of said endless belt opposite said pivotal wing has a diameter slightly larger than said axle end received in said eyepart.

10. A control device as claimed in claim 8, wherein said eyebolt which abuts said wing is laterally offset relative to said ram of said lifting cylinder.

11. A control device as claimed in claim 10, further comprising at least two screws, said screws being screwed into either side of said pivotal wing, wherein the end of said ram and the end of said eyebolt abut the heads of said screws.

12. A control device as claimed in claim 8, further comprising at least two bolt nuts positioned against said cross-member for receiving said eyebolts.

13. A control device as claimed in claim 6, further comprising:

a first plate comprising a slot positioned against said first longitudinal member for supporting the eyebolt on that side;

a stay extending through said slot of said first plate; and a pin which fixedly positions said stay to said first plate.

14. A control device as claimed in claim 13, wherein said first plate further comprises a continuous guide extending through said first plate parallel to said first longitudinal member.

15. A control device as claimed in claim 14, wherein said eyebolt on the same side of said endless belt as said first plate extends through said continuous guide and abuts said pivotal wing.

16. A control device as claimed in claim 15, wherein said eyepart of said eyebolt positioned on the side opposite said pivotal wing has a diameter slightly larger than said axle end received in said eyepart.

17. A control device as claimed in claim 16, further comprising a second plate positioned on the side of said endless belt opposite said first plate for receiving said eyebolt positioned on that side of said endless belt.

18. A control device as claimed in claim 17, further comprising a first bolt nut positioned against said first plate and a second bolt nut positioned against said second plate, said bolt nuts receiving and limiting displacement of said eyebolts counter to the running direction of said endless belt.

* * * * *